(12) United States Patent
Pavageau

(10) Patent No.: US 9,577,384 B2
(45) Date of Patent: Feb. 21, 2017

(54) SECURED MEMORY CARD CONNECTOR

(71) Applicant: Compagnie Industrielle et Financiere D'Ingenierie "Ingenico", Paris (FR)

(72) Inventor: Stephane Pavageau, La Roche de Glun (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/439,961

(22) PCT Filed: Oct. 28, 2013

(86) PCT No.: PCT/EP2013/072529
§ 371 (c)(1),
(2) Date: Apr. 30, 2015

(87) PCT Pub. No.: WO2014/067906
PCT Pub. Date: May 8, 2014

(65) Prior Publication Data
US 2015/0263459 A1    Sep. 17, 2015

(30) Foreign Application Priority Data
Oct. 30, 2012  (FR) ..................... 12 60361

(51) Int. Cl.
*H01R 13/648* (2006.01)
*H01R 13/6585* (2011.01)
*G06K 7/00* (2006.01)

(52) U.S. Cl.
CPC ......... *H01R 13/6585* (2013.01); *G06K 7/0021* (2013.01)

(58) Field of Classification Search
CPC ............ H01R 13/6585; H01R 13/2442; H01R 23/7068; H01R 27/00; G06K 7/0021; G06K 13/08
USPC ............................................ 439/607.14, 630
See application file for complete search history.

(56) References Cited

U.S. PATENT DOCUMENTS

| 5,653,610 A | 8/1997 | Broschard, III |
| 2010/0265681 A1 | 10/2010 | Lambert et al. |

FOREIGN PATENT DOCUMENTS

| DE | 102009026466 B3 | 7/2010 |
| EP | 2241997 A1 | 10/2010 |

OTHER PUBLICATIONS

English Translation of the International Search Report dated Nov. 28, 2013 for International Application No. PCT/EP2013/072529, filed Oct. 28, 2013.
Written Opinion dated Apr. 30, 2015, for International Application No. PCT/EP2013/072529, filed Oct. 28, 2013.
English Translation of the International Preliminary Report on Patentability dated May 21, 2015, or International Application No. PCT/EP2013/072529, filed Oct. 28, 2013.

*Primary Examiner* — Khiem Nguyen
(74) *Attorney, Agent, or Firm* — David D. Brush; Westman, Champlin & Koehler, P.A.

(57) ABSTRACT

A memory card connector including at least one pin for reading a memory card, at least one parallelepiped-shaped base in which the at least one pin is positioned, and an enclosure extending over the rear of the base and forming a continuous barrier between at least two sides of the base.

9 Claims, 4 Drawing Sheets

SECURED MEMORY CARD CONNECTOR

CROSS-REFERENCE TO RELATED APPLICATIONS

This Application is a Section 371 National Stage Application of International Application No. PCT/EP2013/072529, filed Oct. 28, 2013, the content of which is incorporated herein by reference in its entirety, and published as WO 2014/067906 on May 8, 2014, not in English.

FIELD OF THE INVENTION

The invention is situated in the field of memory card readers. An object of the invention more particularly is a memory card reader to be inserted into a memory card reader terminal. Such a terminal can be a payment terminal or an identification terminal. More generally, the invention relates to any type of terminal that can include a memory card reader.

PRIOR ART

Memory card reader terminals comprise, in addition to a memory card reader, a certain number of components such as a keypad, a screen, one or more processors, memory, an electrical power source. For several years now, memory card reader terminals have seen an increase in their functions. This is especially true for payment terminals. In addition to payment function, the terminals have embedded functions for carrying out network communications, detecting contactless memory cards, managing coupons (for example loyalty coupons), etc.

In addition to the increase in such auxiliary functions, memory card reader terminals must also be resistant to various attacks or attempts at fraud to which they are frequently subjected. In order to obtain homogeneous resistance by terminals to attacks, international standards have been laid down. In the field of payment for example, the PCI PED (or Payment Card Industry-Pin Entry Device) standard has laid down requirements in terms of intrusion and detection of attempts to attack terminals. This is not the only standard in force.

However, because of these standards, terminals which previously had low-level protection have gradually been replaced by increasingly secured terminals. Among the different aspects of securing terminals, industrialists in the sector are concerned more particularly with obtaining protection for memory card readers. The memory card reader indeed remains a weak link in the memory card reader terminal. This is because the memory card reader includes a slot for inserting the memory card, and this slot makes the interior of the terminal accessible from the exterior. More particularly, attackers seek to obtain access to the memory card connector. The memory card connector is the part of the memory card reader that comes into contact with the chip or the microprocessor embedded in the memory card. When an attacker succeeds in obtaining access to this memory card connector without being spotted by anybody, then it becomes possible to intercept and read the data exchanged between the chip or the microprocessor of the card and the processor of the memory card reading terminal Among the pieces of data intercepted, we may cite especially the secret code entered by the client when the secret code is requested. This code can then be conveyed without encryption to certain smart cards.

This explains why much effort has been made to secure memory card readers. Thus, for example, memory card readers have been provided with a protection with lattice. This protection prevents an introduction into the terminal by drilling. When an object seeks to penetrate the protective enclosure, a short circuit is produced, causing the terminal to then be put out of service.

Besides, modifications aimed at protecting the memory card containers against electrostatic discharges and against wear and tear have also been proposed. For example, metal parts are disposed at the inlet of the memory card reader. These metal parts provide for mechanical guidance (prevention against wear and tear) and/or the discharging of the card prior to its insertion into the memory card reader. These metal parts commonly have the shape of metal guiding rods with a height of a few millimeters. Another example consists in adding metal parts that take the form of a card discharging comb.

All these modifications have led to great complexity of manufacture. Besides, the cost of manufacture has also increased. At present, the requirements of the standards in terms of security are such that it is necessary, in order to manufacture a reading terminal, it is necessary to plan for numerous steps. These numerous steps bring together, all at once, staggered welding of components, the need to have components resistant to reflow soldering, etc. In addition to the complexities of manufacture of the memory card reader terminal, these methods make the maintenance of the terminals produced highly complex or even impossible, thus giving rise to difficulties for maintenance service providers as well as for the manufacturers of the memory card reader terminal.

Referring to FIG. 1, we present a classic assembly of a memory card reader. This memory card reader comprises a memory card reader body 10 comprising a memory card insertion slot 11. The memory card connector is directly integrated into the memory card reader. It comprises pins 12 for connection to the printed circuit board (PCB) 13 (seen in a partial view). The PCB 13 also has electronic components 14. To protect the memory card reader 10, it is covered with a full protective coating 15 as well as a front protective coating 15b.

There is therefore a need for providing a memory card reading architecture that is intrinsically secured and does not require complementary protection.

3. SUMMARY OF THE INVENTION

The invention thus relates to a memory card connector.

More particularly, the invention pertains to a memory card connector comprising at least one pin for the reading of a memory card, the connector comprising a parallelepiped-shaped base within which said at least one pin is positioned. According to the invention, such a memory card connector comprises an enclosure extending rearwards from said base and forming a continuous barrier between at least two sides of said base.

According to one particular characteristic, said enclosure is a metal part adjoining said base.

According to one particular characteristic, said enclosure defines a protection area that comprises at least one contact termination of said at least one pin.

According to one particular characteristic, said protection area is shaped to enable the positioning of at least one electronic component.

According to one particular characteristic, said enclosure is soldered to a PCB simultaneously with said connector.

According to one particular characteristic, a memory card reader body complementary to said memory card connector is fastened by a screw to a destination PCB, by means of a metal part of said memory card reader.

According to one particular characteristic, said memory card connector furthermore comprises a counter-pressure area of a memory card.

This counter-pressure area is a vertical counter-pressure area.

According to one particular characteristic, said counter-pressure area of a memory card comprises a metallic spring leaf for detecting the presence of a memory card.

According to one particular characteristic, said memory card connector comprises at least one centering hole that is used in conjunction with a centering pad of a memory card reader body.

The invention also relates to a memory card reader terminal. According to the invention, such a terminal comprises a memory card connector as described here above.

4. FIGURES

Other features and advantages of the invention shall appear more clearly from the following description of one preferred embodiment, given by way of a simple, illustrative and non-exhaustive example, and from the appended drawings, of which:

FIG. 1, which has been already presented, shows the classical architecture of a memory card reader;

5. DETAILED DESCRIPTION

5.1. Reminder of the Principle of the Invention

The general principle of the invention consists in proposing an architecture of a memory card reader that directly integrates the functional constraints inherent in the working of this type of device. More particularly, the general principle of the invention consists in the subdivision of the memory card reader into two distinct parts. There is a first part through which the memory card signals travel in transit, this first part also including the switch for detecting the presence of a card. This first part is capable of ensuring a residual portion of the electrostatic discharge (The first part relates to the memory card connector). There is then a second part enabling the insertion of the memory card. This second part ensures firstly the guidance of the memory card and the absorption of the memory card forces. Secondly it carries out a part of the electrostatic discharging of the card. This second part also ensures protection of the signals exchanged between the memory card and the memory card connector (the second part relates to the body of the memory card reader itself). In the context of this disclosure, the memory card connector is specially adapted to increasing the security of the memory card reader thus constituted.

Figure 1:
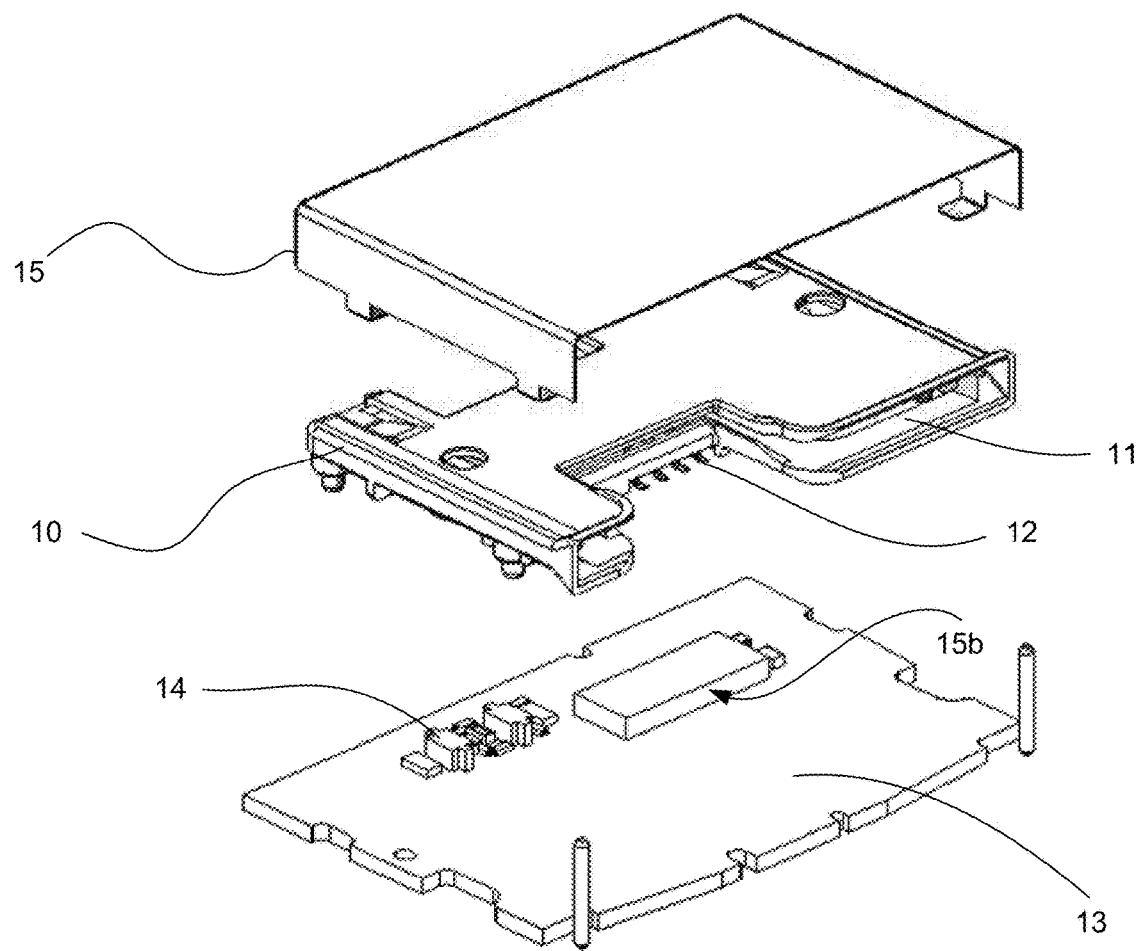
Figure 2:
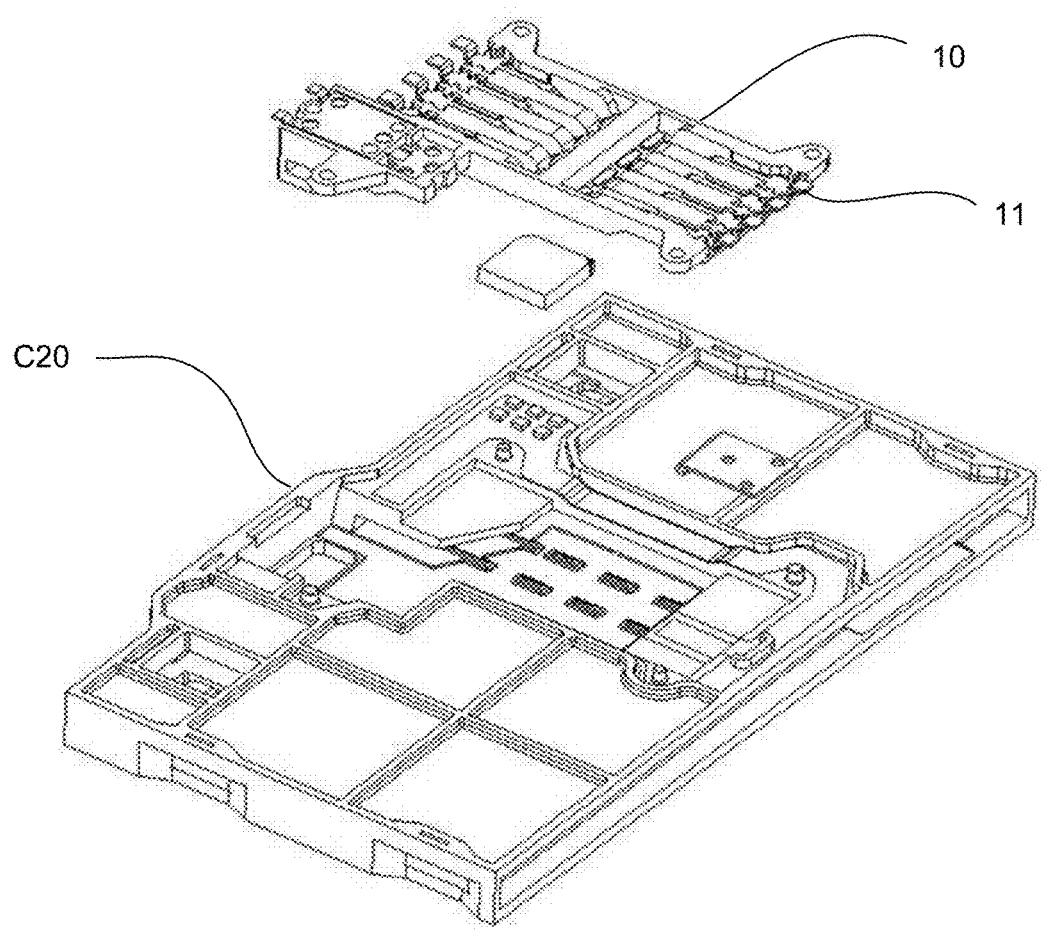
FIG. 2 illustrates the general principle of the invention, namely the subdivision of the memory card reader into two distinct functional units: the memory card connector and the body of the memory card reader.

The general principle of the invention is described with reference to FIG. 2. According to the invention, a memory card connector 10 is built independently of the memory card reader body C20. The memory card connector 10 is designed to enable a reading of the signals coming from the memory card (not shown). In FIG. 1, the memory card connector 10 is designed for the reading of a smart card. To this end, the memory card connector 10 comprises a certain number of pins 11 (eight in FIG. 2) used to come into contact with corresponding areas of the memory card (six or eight areas depending on the memory card). The pins 11 are generally metal spring leaves positioned on the surface of the chip.

According to the invention, on the contrary, this memory smart card 10 is independent of the memory card reader body C20. This means that, unlike in the prior-art systems, the memory card connector 10 is not assembled with the body of the memory card reader C20 before being assembled with the PCB of the reader terminal. Now, not only is this assembly complicated and costly but it is also subject to defects and raises problems of mechanical resistance. The invention, on the contrary, proposes firstly to fix the memory card connector 10 to the PCB and then to fix the body of the memory card reader C20 over the connector 10. In other words, it will be understood that this assembly is not at all of the same nature as the assembly of the prior art since the memory card connector is covered by the body of the memory card reader which, so to speak, protects it, either as a "security" (with the presence of the "lattice") or "functionally" (with the presence of the electrostatic discharge area).

Additionally, in at least one embodiment, the invention proposes to eliminate the protection flexible unit which entirely covers the memory card reader. In one embodiment, the invention replaces this protection flexible unit by an internal protection device, i.e. one that is situated inside the memory card reader body C20 itself.

Here below, one specific embodiment of the invention is described. It is understood that this embodiment in no way restricts the scope of the invention. More particularly, in other embodiments of the invention, the level of security of the memory card connector can be increased by using means that are alternative to those described here below but fulfill similar functions.

5.2. Detailed Description of one Embodiment

In this embodiment of the invention, a specific architecture of the memory card connector is proposed.

Figure 3:
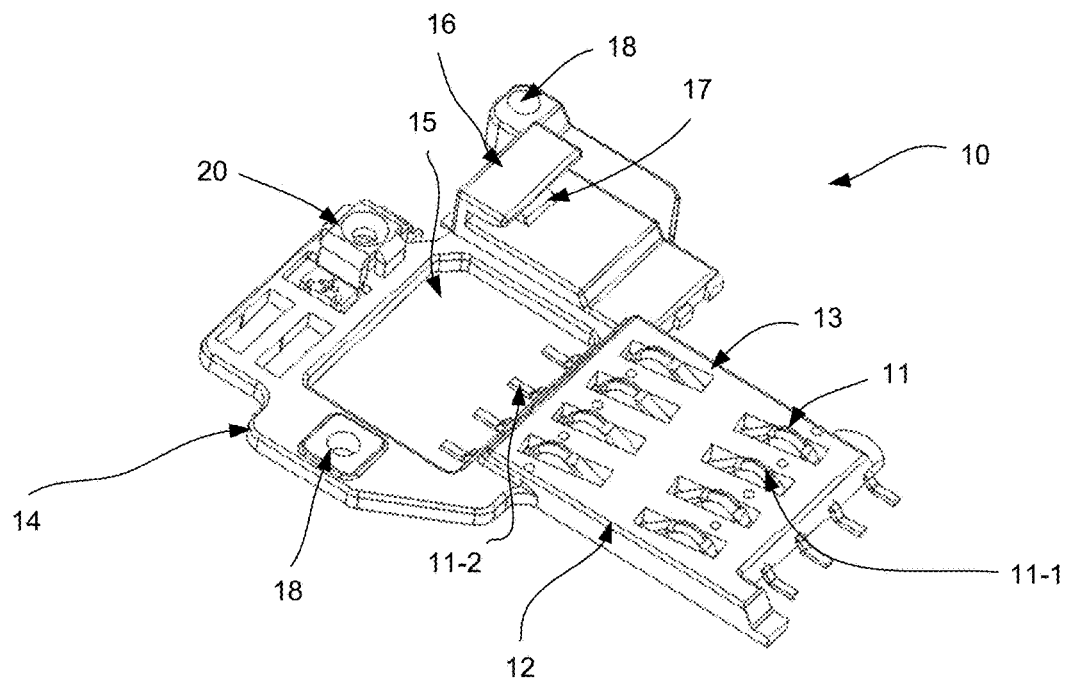
FIGS. 3 and 4 illustrate one embodiment of the invention in which the body of the memory card reader comprises a intrusion detection track.
Figure 4:
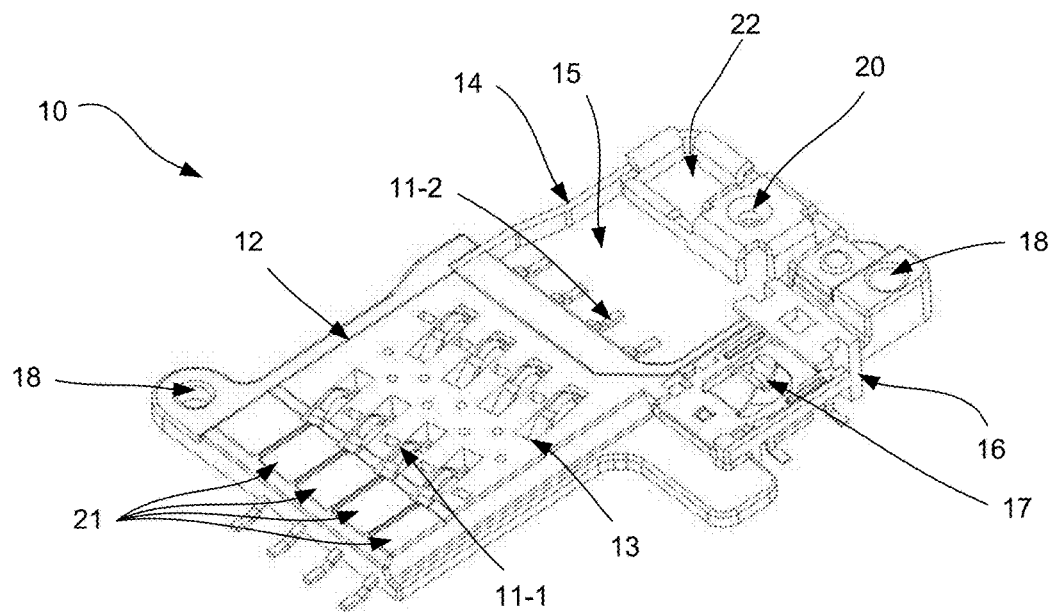

This embodiment is presented more particularly with reference to FIGS. 3 and 4, each of which illustrate two embodiments of the memory card connector that is the object of the invention.

More particularly, in these embodiments, the memory card connector 10 comprises a base 12, with a generally parallelepiped shape within which there are inserted pins 11. In at least one embodiment, the pins are formed by a section of longitudinal elastic strip 11-1, this section coming into contact with at least one predetermined portion of a memory card chip. This putting into contact is done by means of a hole 13 beneath the base 12. In at least one embodiment, a pin comprises, in the extension of the longitudinal elastic strip section, a contact termination 11-2. This contact termination is to be welded to a contact area of the printed circuit. This contact termination emerges behind the base 12. Astutely, a contact termination 11-2 of a given pin 11-1 emerges on the side opposite the hole to which it is related. This can be explained by the fact, that in a smart card, only some contacts of the chip are important. More particularly, only one contact of the chip exchanges data. This is what is commonly called the IO (input/output) pin. The fact of making the contact termination of this IO-pin emerge opposite the hole within which the IO-pin elastic strip is present is interesting in terms of security: access to the contact protrusion of the IO-pin contact is made more complicated. According to the invention, this security is further reinforced within the connector by the use of an enclosure 14 which forms a continuous barrier extending on the rear of the base 12.

This enclosure 14 defines a protection area 15 that comprises contact terminations 11-2, including the IO-pin contact termination. Advantageously, this protection area is also used for positioning sensitive electronic components on the PCB. The sizing of the enclosure has direct influence on the surface area available to enable the integration of the electronic components. Indeed, it must be recalled that the memory card connector 10 is covered with a body of the memory card reader C20 (see FIG. 2). Now, this cover is secured by the use of a protective lattice on the internal surface of the memory card reader body. In other words, once covered by the memory card reader body, the protection area 15 is protected, by the protection lattice 14, on the top and on the side, and is reinforced on each side by the protection enclosure 14. Thus, there is an almost inviolable protection area 14.

In one embodiment (FIG. 4), this enclosure is made of metal, soldered simultaneously to the memory card connector.

In at least one embodiment, the memory card connector 10 furthermore comprises a counter-pressure area 16. This counter-pressure area 16 fulfils two functions: the first is that of enabling adaptation to the thickness of the card. Indeed, the assembly as proposed leads to a certain degree of tolerance as regards the height of the memory card reader body relative to the memory card connector. This counter-pressure area makes it possible to manage this slight difference in height in ensuring that the card will not be deflected during its insertion. The second function is that of detecting the complete insertion of the card (this is the switch system). This second function is fulfilled by the use of a metal spring leaf 17 included in the counter-pressure area. This metal spring leaf 17 is connected to the processor of the payment terminal by means of a solder made on the printed circuit board (PCB). When the contact is set up, it means that the card is completely inserted into the reader. This activates the pins 11 of the connector (thus, when the card is not completely inserted, the pins of the connector are not powered). This has two advantages. The first is that it limits the possibilities of fraud since it is not possible to simulate the introduction of a card into the reader. The second is that it prevents the terminal from being burned out by a non-discharged card because when the card comes to a stop on the counter-pressure area, it is completely discharged (no ESD) and then the pins are activated:
- the stopping of the card, as such, is not done by the connector but by the body of the reader. Indeed, the terminations soldered as CMS (surface-mounted component) by reflow soldering do not have sufficient resistance to ensure efficient behavior over thousands or even hundreds of thousands of cycles. This explains the presence of the centering devices on the connector so that the connector/reader body assembly is more resistant;
- the stopping is done by the body of the reader;
- the mechanical holding of the connector is partially ensured by the contact terminations soldered to the card.

The detection switch of the reader follows rules of the art known in the smart card connectors (sequencing of the detection: the switch is activated before arrival at a complete stop, and the information on the withdrawal of the card arrives before the contacts of the smart card leave the contact area).

The invention however has one specific feature at the level of the switch: the switch terminations are rotated by 90°, thus enabling the metal part to be placed in the rear and enabling the contact terminations to be visible during the soldering.

In the two embodiments presented with reference to FIGS. 3 and 4, the connectors furthermore comprise at least one centering hole 18 that is used in conjunction with the body of the memory card reader, which itself comprises at least one corresponding centering pad. The centering hole 18 is used to ensure accurate assembly of the memory card reader and to prevent roughly precise positioning, and, incidentally, to enable precise definition of the stop position at the end of travel of the memory card.

Figure 5:
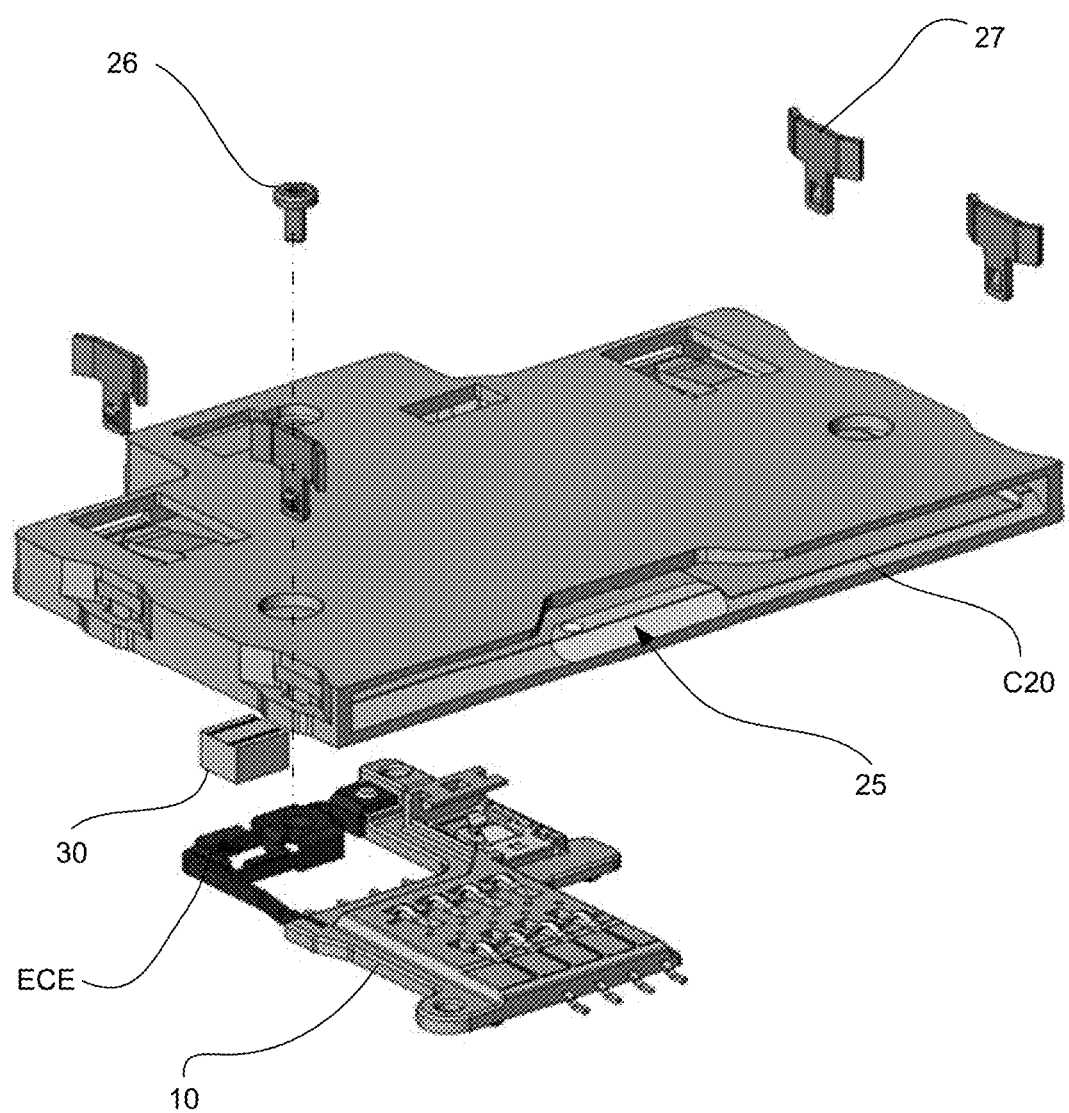
FIG. 5 illustrates a system in which the body of the memory card reader takes position.

In the two embodiments presented with reference to FIGS. 3 and 4, the connectors also comprise at least one metal insert 20. This metal insert 20 enables the addition, rigidly relative to the PCB, of a complementary part (this complementary part being the body of the memory card connector) via a screw (reference 26, FIG. 5) which joins the memory card connector with the memory card reader body. This screw 26 is screwed into the insert 20 which is itself soldered or bonded to the PCB (the line of dashes in FIG. 5 represents the axis of insertion of the screw).

This insert is added into the memory card connector in the embodiment of FIG. 3. In the embodiment of FIG. 4, this insert forms part of the enclosure 14 which is in itself metallic and is soldered (or fixed) to the PCB itself in order to ensure that this enclosure (or the memory card connector) cannot be lifted. This metal insert has several advantages:
- it is made solely of a folded metal sheet which, in terms of cost, is highly advantageous;
- the specific shape of this insert makes it possible to gain space on the circuit while at the same time having a major holding force and remaining compatible with presently used reflow processes;
- in one particular embodiment, this insert can emerge from the continuous strip used to make the contacts. Its cost is then totally neutral (only the cost of the screw is added for the mechanical fixing);
- this insert enables the body of the memory card connector to be connected reliably in keeping the structured part pressed against the electronic circuit;
- two methods of mounting can be envisaged: either the insert is over-molded (but this can raise problems of planeity) or the insert is clipped on so as to be floating and therefore there is no problem of planeity.

In concrete terms, this insert enables the bolt to be replaced in order to adjoin the screw (see FIG. 5) without having to make a hole in the PCB (which is expensive and fairly constraining at the PCB defining level because this hole can be situated so as to be facing a useful area (a key for example)) and without adjoining an additional part. No surface area is lost because of the hole which is normally needed for the screw. Since no surface area is lost, it is possible to place more components and therefore reduce the size of the assembly.

5.3. Complementary Characteristics

In addition to the characteristics described here above, the memory card connector as defined is constituted by a dissipative material (VECTRA A700 LCP type). This connector can then comprise a discharge area (called an ESD) enabling a discharging of the memory card when it is inserted into the reader. This area is numbered 21 in FIG. 4.

These are local shapes which are used to finish the discharging of the memory card before contact with the connector (charged plastic). The local shapes make it possible to have highly localized contacts and therefore, by point effect, a better discharge.

Besides, again in the embodiment of FIG. 4, the enclosure 14 comprises a positioning area 22 for positioning an elastomeric connector, for example of the Zebra (registered mark) type. Thus, in order to avoid the problems related to the welding of the protective lattice (on the inner face of the body of the memory card connector) to the PCB, the connection between these two elements is done by means of an elastomeric connector, for example of the Zebra (registered mark) type. Thus, it is not necessary to make available a complex mechanism for welding the body of the memory card reader to the PCB: indeed, since the connection is provided by means of an elastomeric connector, the mounting of the unit formed by the memory card connector, the elastomeric connector and the body of the memory card reader is facilitated.

More generally, to facilitate the assembly, the following steps are implemented:
- a step for fastening the memory card connector to the PCB. This fastening can be done by screwing in or by soldering or by bonding or by a combination of these methods. Other fastening methods can also be used.
- a step for positioning the elastomeric connector (when it is used). The positioning of the elastomeric connector can advantageously be done in an area left free for this purpose within the memory card connector.
- a step for positioning and fastening the body of the memory card reader with a mode of fastening of the body of the reader relatively to the PCB. In the case of a Zebra, a screw held in a part of the memory card connector is an advantageous solution or again the addition of a fifth pin acting as a mechanical holding piece.

Thus, only two or three steps are needed to assemble and fix the memory card reader to the PCB.

Description of one embodiment of a memory card reader

This embodiment is more particularly described with reference to FIG. 4. For greater simplicity, the numerical references that have been previously used in FIGS. 2 and 3 are kept. In this embodiment, the memory card reader comprises a memory card reader body C20, a memory card connector 10, and an elastomeric connector 30. The architecture of the memory card connector 10 is built so that it comprises a space ECE left free for the positioning of the elastomeric connector 30. Thus, during the assembling, the memory card connector 10 is first of all fixed to the PCB and then the elastomeric connector 30 is inserted into the space ECE. The body of the memory card reader C20 is then positioned above the unit formed by the memory card connector and the elastomeric connector. As already mentioned, the body of the memory card connector C20 comprises an area for discharging the card 25. The body of the memory card C20 is fixed to the PCB by means of a screw 26 (via the memory card connector) and four anchoring slugs 27. The anchoring slugs have a particular shape adapted on the one hand to fulfilling a function of guiding the memory card in the reader and, on the other hand, if necessary, to carry out an electrostatic discharging of the edges of the inserted card. The screw 26 is possibly screwed in or bonded to the PCB (the dashed line in FIG. 5 represents the axis of insertion of the screw). It is therefore not necessary to provide for a hole in the PCB. At the minimum, the fastening of the body of the memory card C20 is made by the fastening or the soldering of the memory card connector 10 to the PCB, as described here above, and the adjoining of the fastening screw between the body of the memory card reader C20 and the memory card connector 10.

In addition, in this system, the centering between the memory card connector and the body of the memory card reader enable rigorously accurate positioning.

Indeed, in this embodiment, the memory card connector comprises at least two centering holes. The centering holes are configured so that the centering pads which are integrated into the body of the memory card reader can take position in these centering holes. Thus, in this embodiment, it is not possible to carry out an erroneous mounting of the memory card reader. More particularly, it is not possible to position the body of the memory card reader at an incorrect angle relative to the connector.

The invention claimed is:

1. A memory card connector comprising:
   at least one pin for reading a memory card;
   a connector comprising a parallelepiped-shaped base within which said at least one pin is positioned; and
   an enclosure extending rearwards from said base and forming a continuous barrier between first and second sides of said base, said enclosure defining a protection area that comprises at least one contact termination of said at least one pin.

2. The memory card connector according to claim 1, wherein said enclosure is a metal part adjoined to said base.

3. The memory card connector according to claim 1, wherein said protection area is shaped to enable positioning of at least one electronic component.

4. The memory card connector according to claim 2, wherein said metal part is positioned so as to be floating vertically relative to said base, so that said metal part enables simultaneous soldering to a destination PCB.

5. The memory card connector according to claim 1, wherein a memory card reader body, complementary to said memory card connector, is fastened to a destination PCB, by means of a metal part of said memory card reader, said fastening being made by a screw.

6. The memory card connector according to claim 1, furthermore comprising a counter-pressure area of a memory card.

7. The memory card connector according to claim 6, wherein said counter-pressure area of a memory card comprises a metallic spring leaf configured to detect presence of a memory card.

8. The memory card connector according to claim 1, furthermore comprising at least one centering hole that is used in conjunction with a centering pad of a memory card reader body.

9. A memory card reader terminal comprising:
   a memory card connector comprising:
      at least one pin for reading a memory card;
      a parallelepiped-shaped base within which said at least one pin is positioned; and
      an enclosure extending rearwards from said base and forming a continuous barrier between first and second sides of said base, said enclosure defining a protection area that comprises at least one contact termination of said at least one pin.

* * * * *